UNITED STATES PATENT OFFICE.

PAUL FRIEDLAENDER, OF VIENNA, AUSTRIA-HUNGARY, ASSIGNOR TO THE FIRM OF KALLE AND COMPANY AKTIENGESELLSCHAFT, OF BIEBRICH, GERMANY.

THIO-INDOXYL DERIVATIVE AND PROCESS OF MAKING SAME.

No. 850,827.      Specification of Letters Patent.      Patented April 16, 1907.

Application filed November 16, 1905. Serial No. 287,727. (Specimens.)

*To all whom it may concern:*

Be it known that I, PAUL FRIEDLAENDER, doctor of philosophy, a subject of the Emperor of Austria, residing at Vienna, Austria-Hungary, have invented certain new and useful Improvements in Thio-Indoxyl Derivatives and Processes of Making Same, of which the following is a specification.

My invention relates to thio-indoxyl derivatives and process of making the same. For instance, if an alkali salt of chloracetic acid is acted upon by an alkali salt of thiosalicylic acid,

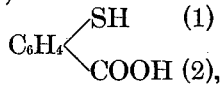

phenyl-thio-glycol-ortho-carboxylic acid,

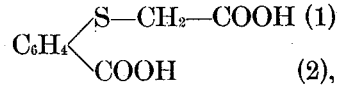

is obtained. It is advantageous to carry out this reaction in the presence of an alkali salt which will combine with the hydrochloric acid produced. The new acid forms a white crystalline mass difficultly soluble in cold water, but readily soluble in dilute alkalies. When crystallized out of dilute alcohol, it is obtained in the form of colorless needles which melt at about 211° centigrade.

Phenyl-thio-glycol-ortho-carboxylic acid is converted by dehydration or the removal of water into a new compound,

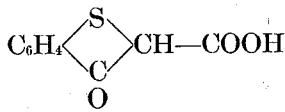

or

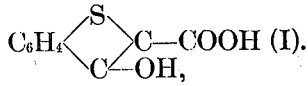

which on being heated alone or in the presence of dilute acids evolves carbonic acid, with the formation of another new compound having probably the following constitution:

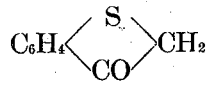

or

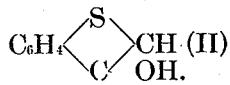

I designate the compound I as "thio-indoxyl-carboxylic acid" and (in accordance with this nomenclature) compound II as "thio-indoxyl." The products to which this application refers are therefore thio-indoxyl derivatives of the following general constitution:

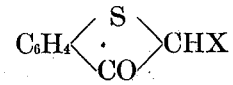

or

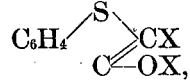

in which X serves to denote either a carboxylic group or a hydrogen atom.

The new compounds have the following properties: Thio-indoxyl-carboxylic acid is difficultly soluble in cold water. It is, however, readily dissolved by dilute alkalies, with the formation of the corresponding salts. The thio-indoxyl-carboxylic acid can by acidifying the alkali solution be again precipitated therefrom as a yellowish-white crystalline mass, which gradually becomes red under the action of air and light. If a suspension of this acid in water be heated, carbon dioxid is evolved and thio-indoxyl is formed. The separation of the carbon dioxid is greatly facilitated by the action of acids. If this acid be heated some considerable time by itself at a high temperature, the carbon dioxid is given off and thio-indoxyl formed, which distils over with aqueous vapors and has an odor similar to that of alpha-naphthol and melts in the pure state at 73° centigrade. Both compounds are distinguished by the property to be transformed into a most valuable red-sulfur coloring-matter by a treatment with air or by the action of other oxidizing agents.

The following examples will illustrate how the invention may be carried out; but I do not bind myself to the precise modes of operation nor to the precise proportions stated, the said examples being merely some modes of carrying out the process whose general characteristics have been hereinbefore stated.

Example I: Twenty kilograms of phenyl-thio-glycol-ortho-carboxylic acid are stirred with a little water and introduced at 100° centigrade into a mixture of one hundred kilograms of caustic soda and twenty liters of water. The temperature is then raised to from 170° to 180° centigrade, and that temperature is maintained for about an hour. The melt contains the thio-indoxyl-carboxylic acid in the form of its sodium salt. To isolate the acid, the cooled melt is dissolved in water and (taking care to avoid any appreciable rise of temperature) slightly acidified by means of mineral acid, filtered, and pressed. The thio-indoxyl-carboxylic acid may also be oxidized directly into a coloring-matter without previous isolation.

Example II: It is also possible to convert the phenyl-thio-glycol-ortho-carboxylic acid into the thio-indoxyl derivative by mixing it intimately with more than two molecular proportions of dry caustic soda and then heating it to a temperature varying between 160° and 250° centigrade. A mixture consisting of twenty kilograms of phenyl-thio-glycol-ortho-carboxylic acid and sixteen kilograms of caustic soda is heated for an hour in an oven to a temperature of 250° centigrade. After cooling the product is dissolved in water and acidified with mineral acid. The thio-indoxyl-carboxylic acid is thereby separated as a white precipitate. If on acidifying the temperature is allowed to rise, carbon dioxid is partly given off and a corresponding quantity of thio-indoxyl is obtained along with the thio-indoxyl-carboxylic acid.

Example III: The action of other agents can also cause the condensation of the phenyl-thio-glycol-ortho-carboxylic acid into thio-indoxyl-carboxylic acid. One part by weight of the phenyl-thio-glycol-ortho-carboxylic acid is mixed with about five parts, by weight, of acetic anhydrid and a little sodium acetate, and the mixture is heated for a short time to from 50° to 80° centigrade. The condensation takes place smoothly and rapidly. If heated to a higher temperature, carbon dioxid is evolved and thio-indoxyl is obtained along with the thio-indoxyl-carboxylic acid, and when the heating is carried on for a sufficiently long time only thio-indoxyl is obtained. In the above examples instead of phenyl-thio-glycol-ortho-carboxylic acid its acid or neutral esters may be used, in which case the condensation into thio-indoxyl-carboxylic acid is advantageously carried out by means of sodium alcoholate, or alcoholic caustic soda.

Example IV: Seventy-five kilograms of a paste containing twenty per cent. of thio-indoxyl-carboxylic acid are diluted with two hundred liters of water and mixed with ten kilograms of hydrochloric acid. The mixture is heated in a vessel provided with a reflux condenser until the whole mass is melted. The thio-indoxyl-carboxylic acid is converted into thio-indoxyl with evolution of carbon dioxid. After cooling the thio-indoxyl is filtered and washed.

Example V: Seventy-five kilograms of a paste containing twenty per cent. of thio-indoxyl-carboxylic acid are diluted with two hundred liters of water in a suitable distilling vessel. The mixture is heated to 100° centigrade, and a current of steam is passed through it. Carbon dioxid is evolved, and the thio-indoxyl-carboxylic acid is converted into thio-indoxyl, which distils off with the aqueous vapors.

Example VI: Fifteen kilograms of finely-pulverized phenyl-thio-glycol-ortho-carboxylic acid are heated for about two hours in a suitable vessel. Aqueous vapor is first given off, and afterward carbon dioxid is evolved. The thio-indoxyl obtained can be purified by distillation with aqueous vapors or by any other suitable method.

In producing thio-indoxyl its property of oxidizing readily in contact with air or oxidizing agents should in all cases be taken into account.

The above-described thio-indoxyl derivatives are of high technical value—for instance, for the production of a new red sulfur containing coloring-matter—*cf.* my application for Letters Patent of the same date.

Now what I claim is—

1. A process for the preparation of thio-indoxyl-carboxylic acid by reacting on phenyl-thio-glycol-ortho-carboxylic acid with deyhdrating agents.

2. A process for the formation of thio-indoxyl by heating thio-indoxyl-carboxylic acid.

3. A process for the formation of thio-indoxyl by heating thio-indoxyl-carboxylic acid with the addition of acids.

4. As new products of manufacture thio-indoxyl derivatives obtainable as hereinbefore described, being difficultly soluble in water, easily soluble in alkalies and which are transformed into red dyes containing sulfur on treatment with oxidizing agents.

5. As a new product, the thio-indoxyl-carboxylic acid, obtainable by treating phenyl-thio-glycol-ortho-carboxylic acid with deyhdrating agents, being a colorless crystalline body difficultly soluble in water easily soluble in alkalies, giving off carbon dioxid on heating, and which by treatment with oxidizing agents is transformed into a red dye containing sulfur.

In testimony whereof I have signed my name to this specification in the presence of two subscribing witnesses.

PAUL FRIEDLAENDER.

Witnesses:
IGNAZ ROSENBERG,
JEAN GRUND.